Dec. 3, 1968  R. L. PAWSAT  3,414,223
BASKET ATTACHMENT FOR BICYCLES
Filed Dec. 23, 1966  2 Sheets-Sheet 1
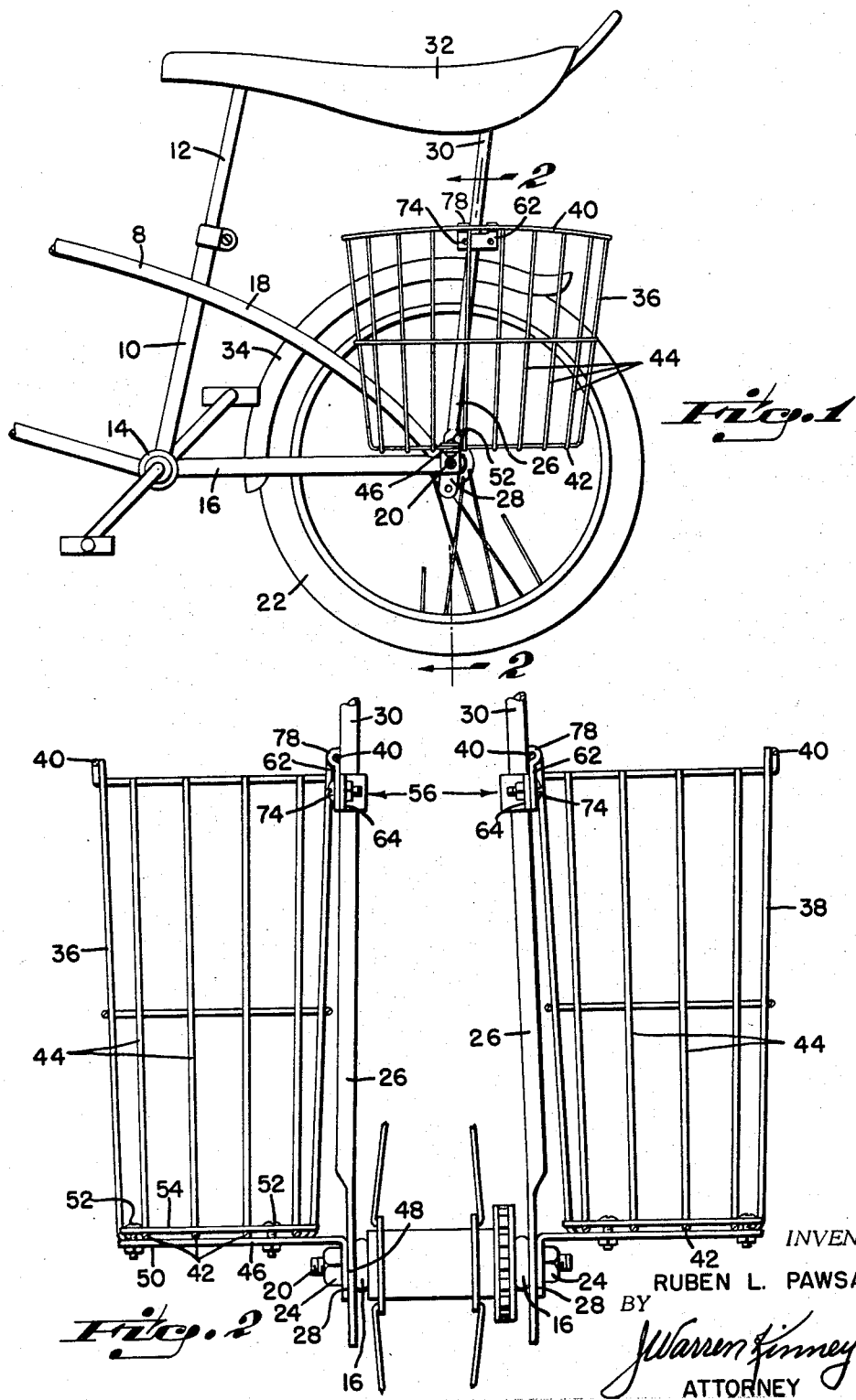
INVENTOR.
RUBEN L. PAWSAT
BY
J. Warren Kinney Jr.
ATTORNEY Dec. 3, 1968   R. L. PAWSAT   3,414,223
BASKET ATTACHMENT FOR BICYCLES
Filed Dec. 23, 1966   2 Sheets-Sheet 2
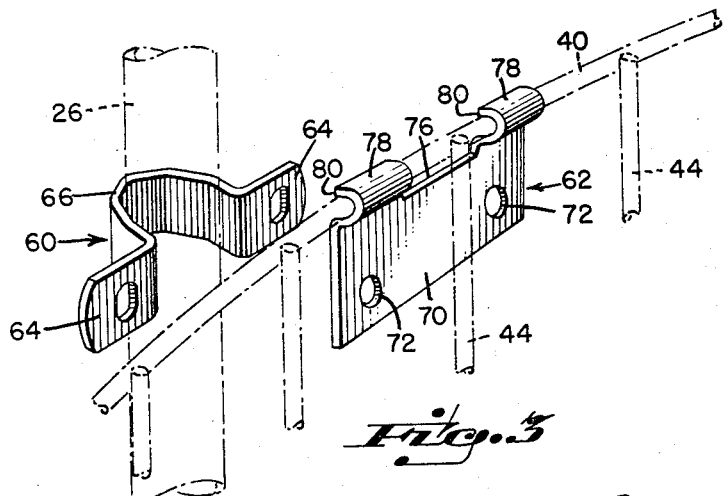
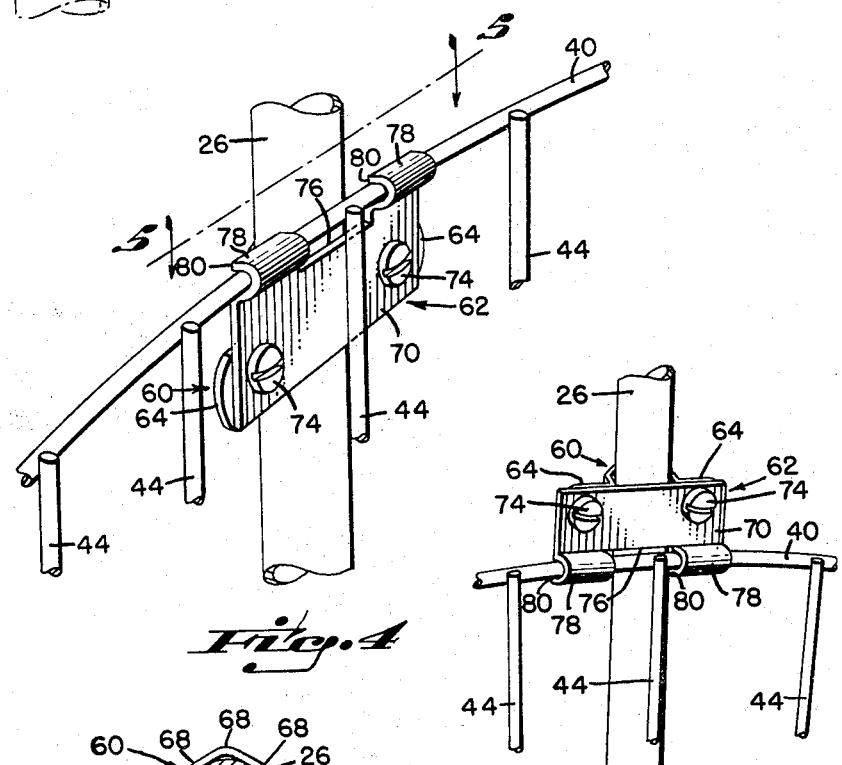
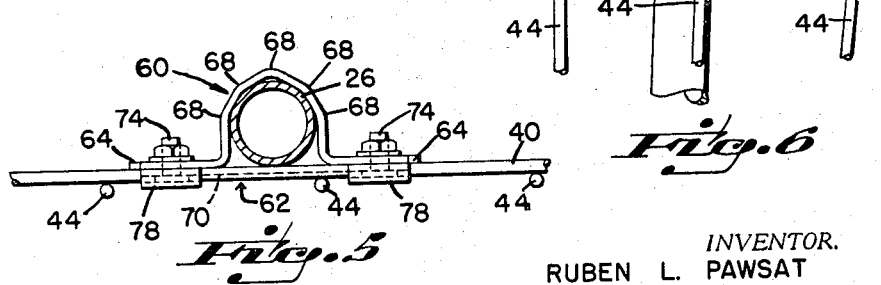
INVENTOR.
RUBEN L. PAWSAT
BY
J. Warren Kinney Jr.
ATTORNEY United States Patent Office 3,414,223
Patented Dec. 3, 1968

3,414,223
BASKET ATTACHMENT FOR BICYCLES
Ruben L. Pawsat, Maysville, Ky., assignor to Wald Manufacturing Company, Incorporated, Maysville, Ky., a corporation of Kentucky
Filed Dec. 23, 1966, Ser. No. 604,399
15 Claims. (Cl. 248—230)

ABSTRACT OF THE DISCLOSURE

A simple, inexpensive, efficient device for supporting and clamping a wire basket upon a bicycle brace member which supports a polo seat, said device having hook members facilitating application and removal using common tools.

Brief summary of the invention

This invention relates to a basket having means for attaching it to bicycles, and pertains especially to the mounting of twin baskets upon bicycles provided with polo seats, or banana seats, which generally overlie the rear wheel and are braced from the rear wheel axle of the bicycle. The attaching means comprise a bracket disposed under the base of the basket, and a clamp carried by an upper rim portion of the basket. The bracket and clamp both include means for securement to the basket and to a bicycle.

One object of the present invention is to provide an improved basket attachment means whereby a basket, or preferably a pair of twin baskets, may be mounted alongside the rear wheel of a bicycle of the type above mentioned.

Another object of the invention is to provide a novel method and means of attachment for baskets, upon a bicycle equipped with a polo or banana seat, which is simple, inexpensive, and extraordinarily durable, while possessing the further advantage of quick and easy installation with the use of ordinary tools.

A further object of the invention is to provide improved and simplified clamp means for effectively securing a basket, or preferably twin baskets, astride the rear wheel of a bicycle equipped with a polo or banana seat that receives support from a pair of upright braces anchored upon the bicycle frame in the region of the rear wheel axle.

Another object is to provide clamp means for the purpose stated, which is extremely versatile in its application, and capable of securing baskets of different sizes and shapes upon the seat braces of a polo seat or banana seat of a bicycle.

The foregoing and other objects are attained by the means described herein and illustrated upon the accompanying drawings, in which:

FIG. 1 is a fragmental side elevation of a bicycle equipped with a polo seat, or banana seat, and showing a pair of twin baskets mounted upon the bicycle in accordance with the present invention.

FIG. 2 is an enlarged cross-section taken on line 2—2 of FIG. 1.

FIG. 3 is a perspective detail view showing a basket clamp means in the course of attachment to a seat brace.

FIG. 4 is a view similar to FIG. 3, showing the clamp means applied to the seat brace and a basket supported thereby.

FIG. 5 is a cross-section taken on line 5—5 of FIG. 4.

FIG. 6 is a perspective view showing an alternative means of attaching a basket to a polo seat brace.

With reference to the drawings, FIG. 1 illustrates generally a bicycle frame 8 which usually includes a tubular upright member 10 supporting a forward seat post 12, said member 10 being extended upwardly from the hanger bearing housing 14. A pair of rigid rear fork members 16 and 18 support the rear wheel axle 20, upon which the rear wheel 22 is journalled. Axle 20 may be threaded at its opposite ends to receive nuts 24, for securing to the axle ends the lower end portions 28 of identical upright braces 26, which brace ends may be perforated to receive the ends of the axle. The upper end portions 30 of braces 26 provide support for the rear end of a polo seat or banana seat 32. Seat 32 may include means, not shown, for adjusting its elevation at post 12 and brace end 30, if desired.

From the disclosure of FIG. 2, it is apparent that braces 26 would interfere rather seriously with the mounting of any basket overlying the fender 34. Accordingly, the twin baskets 36 and 38 are preferably located at the outer sides of braces 26, and are supported upon the braces and upon rear axle 20. Each basket may include an upper circumferential rim member 40, and a bottom constituted of a plurality of heavy wires 42. Upright wires 44 may define the several upright walls of the baskets.

Each basket bottom may be attached to and supported by a strap metal angle member or bracket 46, having a down-turned perforated short leg 48 receptive of axle 20 so that the leg may be securely clamped against the flattened lower end portion 28 of a brace, by means of an axle nut 24. The longer leg 50 of bracket 46 may underlie a basket bottom as shown in FIG. 2. Leg 50 may be perforated at suitable locations to receive bolts 52 which pass through a flat correspondingly perforated clamp bar 54 overlying the wires 42 of the basket bottom. Wires 42 are thereby clamped securely between the clamp bar 54 and the longer leg 50 of the bracket.

A rim clamp 56 is provided for securing the rim of each basket to one of the seat-support braces 26. The rim clamps are identical to one another, wherefore a description of one will suffice for the other also.

As best illustrated by FIGS. 3 to 6, the basket rim clamp may comprise two simple parts 60 and 62 adapted to embrace and securely fasten the basket rim to an upright brace 26. Part 60 may be in the form of a metallic strap having perforate opposite ears or end portions 64 arched as shown, and an intermediate part-cylindrical body portion 66 curved to fit a brace 26. The curvature of body portion 66 may be angled as shown at 68 of FIG. 5, to augment the gripping force of the clamp part.

Clamp part 62 may comprise a rigid metallic plate 70, having perforations 72 to register with the perforations of ears 64, so that bolts 74 may be inserted to join part 60 to part 62 while securely embracing an upright member 26. Along one longitudinal edge 76 of clamp part 62, is integrally formed a pair of hooks 78, 78, disposed laterally of one face of the plate 70, each hook having a free end 80 forming with the adjacent edge of the plate an open mouth receptive of a rim wire 40. The hook mouths are seen to open laterally of plate 70, near opposite ends of the plate. In a preferred form of the clamp, the hook ends 80 may rest in the mean plane of plate 70, or substantially so.

The hooks 78 may be snugly receptive of the basket rim member 40, and when bolts 74 are tightened the rim member will be effectively held while the clamp securely engages brace 26. An upright wire 44 of the basket wall may be disposed either outside or inside the confines of the assembled rim clamp parts in FIGS. 3 and 4. In the alternative assembly depicted by FIG. 6, the rim clamp projects above the basket rim, whereas in the other drawing views the rim clamp depends from the basket rim (FIG. 4, for example).

The rim clamp means as disclosed presents no edges or sharp corners to catch upon articles inserted into or removed from the basket, and application or removal of a basket may be accomplished very simply and expeditiously with the use of commonly available tools. Advantageously also, the clamp means are constituted of a minimum number of simple and inexpensive parts durably constructed to afford maximum holding power for clamping the basket alongside the brace member 26. Baskets of different sizes and capacities may be accommodated by the same clamps and supports.

It is to be understood that various modifications and changes may be made in the structural details of the device, within the scope of the appended claims, without departing from the spirit of the invention.

What is claimed is:

1. A basket structure for bicycles of the type having a polo seat including a rear seat portion supported upon a pair of spaced upright braces projecting upwardly from the rear wheel axle of the bicycle, said basket structure comprising in combination: a basket having a bottom, and side walls each including an upper rim member above the basket bottom; a bracket adapted to be supported by and secured to the rear wheel axle and including a leg laterally extended beyond the axle end to underlie and support the basket bottom; and clamp means to engage an upright brace and the upper rim member of the basket, for anchoring the basket upon said brace.

2. The combination as specified by claim 1, wherein is included means for securing the basket bottom to the laterally extending leg of the axle-supported bracket.

3. The combination as specified by claim 1, wherein the upper rim member is in the form of a rigid wire arranged circumferentially of the upper portion of the basket.

4. The combination as specified by claim 3, wherein the clamp means for the upper rim member of the basket, comprises a substantially flat rigid plate having an edge deformed to provide a pair of integral aligned hook members spaced apart, said hook members each having a mouth receptive of the upper rim member of the basket, the mouths of the hook members being open laterally of the plane of the plate; and a clamp strap having opposite ends and an intermediate partly cylindrical portion, the latter portion being formed to embrace one of the upright braces; and means for securing the opposite ends of the clamp strap upon the substantially flat rigid plate aforesaid.

5. The combination as specified by claim 4, wherein the securing means last mentioned comprises perforations in opposite ends of the clamp strap, and other perforations in the rigid plate to register with the perforations of the clamp strap, and removable fasteners accommodated in the registered perforations, for securing said clamp strap to said rigid plate.

6. The combination as specified by claim 5, wherein the intermediate partly cylindrical portion of the clamp strap is provided with interior angular surfaces to engage a portion of the circumference of the upright brace.

7. The combination as specified by claim 4, wherein the hook mouths are defined by terminal edge lying in substantially the mean plane of the flat rigid plate.

8. The combination as specified by claim 5, wherein the hook mouths are defined by terminal edges lying in substantially the mean plane of the flat rigid plate.

9. The combination as specified by claim 4, wherein the basket side walls include upright spaced wires depending from the upper rim member, and at least one of said upright spaced wires is disposed between the rigid plate and the clamp strap intermediate the spaced hook members of said plate.

10. Clamp means for attaching a wire rim basket to a bicycle of the type having a polo seat including a rear seat portion supported upon a pair of upright braces projecting upwardly from the rear wheel axle of the bicycle, said clamp means comprising: a substantially flat rigid plate having an edge formed to provide a pair of integral aligned hook members spaced apart, said hook members each having a mouth receptive of the wire rim of the basket, the mouths of the hook members being open laterally of the plane of the plate; a clamp strap having opposite ends and an intermediate partly cylindrical portion, the latter portion being formed to embrace one of the upright braces of the polo seat; and means for securing the clamp strap upon the substantially flat rigid plate, with the upright brace interposed between the plate and said clamp strap.

11. The clamp means as specified by claim 10, wherein the securing means last mentioned comprises perforations in opposite ends of the clamp strap and other perforations in the rigid plate to register with the perforations of the clamp strap, and removable fasteners accommodated in the registered perforations, for securing said clamp strap to said rigid plate.

12. The clamp means as specified by claim 10, wherein the intermediate partly cylindrical portion of the clamp strap is provided with interior angular surfaces to engage a portion of the circumference of the upright brace.

13. The clamp means as specified by claim 10, wherein the hook mouths are defined by terminal edges lying substantially within the mean plane of the flat rigid plate.

14. The clamp means as specified by claim 11, wherein the hook members are disposed wholly at one side only of the plane of the rigid plate aforesaid.

15. The clamp means as specified by claim 11, wherein the perforated ends of the clamp strap are arched transversely to impart limited resiliency to the strap in the region of the securing means.

References Cited

UNITED STATES PATENTS

| | | | |
|---|---|---|---|
| 2,209,846 | 7/1940 | Pawsat | 224—36 |
| 2,675,151 | 4/1954 | Herbert | 224—30 |
| 3,157,327 | 11/1964 | Karbin | 224—30 |
| 3,239,181 | 3/1966 | Ellerbrock | 248—210 |

JOHN PETO, *Primary Examiner.*